(12) United States Patent
Shimizu et al.

(10) Patent No.: US 7,021,991 B2
(45) Date of Patent: Apr. 4, 2006

(54) POLISHING APPARATUS

(75) Inventors: Kazuo Shimizu, Tokyo (JP); Shinro Ohta, Tokyo (JP); Akihiro Tsukada, Tokyo (JP)

(73) Assignee: Ebara Corporation, Tokyo (JP)

( * ) Notice: Subject to any disclaimer, the term of this patent is extended or adjusted under 35 U.S.C. 154(b) by 58 days.

(21) Appl. No.: 10/670,499

(22) Filed: Sep. 26, 2003

(65) Prior Publication Data

US 2004/0067718 A1    Apr. 8, 2004

(30) Foreign Application Priority Data

Sep. 27, 2002   (JP) ............................... 2002-283798

(51) Int. Cl.
    *B24B 49/00*    (2006.01)
(52) U.S. Cl. .............. 451/6; 451/5; 451/287; 438/16
(58) Field of Classification Search ............ 451/5, 451/6, 8, 41, 285–289; 438/690–692, 8, 438/16
    See application file for complete search history.

(56) References Cited

U.S. PATENT DOCUMENTS

| | | | | |
|---|---|---|---|---|
| 5,254,830 A * | 10/1993 | Zarowin et al. | ........ | 219/121.43 |
| 5,672,091 A | 9/1997 | Takahashi et al. | | |
| 5,838,447 A * | 11/1998 | Hiyama et al. | ................ | 451/6 |
| 5,893,796 A | 4/1999 | Birang et al. | | |
| 5,899,792 A | 5/1999 | Yagi | | |
| 5,910,846 A | 6/1999 | Sandhu | | |
| 6,004,187 A * | 12/1999 | Nyui et al. | ..................... | 451/5 |
| 6,102,775 A | 8/2000 | Ushio et al. | | |
| 6,108,092 A | 8/2000 | Sandhu | | |
| 6,159,073 A | 12/2000 | Wiswesser et al. | | |
| 6,280,289 B1 | 8/2001 | Wiswesser et al. | | |
| 6,296,548 B1 | 10/2001 | Wiswesser et al. | | |
| 6,334,807 B1 | 1/2002 | Lebel et al. | | |
| 6,399,501 B1 | 6/2002 | Birang et al. | | |
| 6,476,921 B1 | 11/2002 | Saka et al. | | |
| 6,494,766 B1 | 12/2002 | Wiswesser et al. | | |
| 6,503,767 B1 | 1/2003 | Korovin | | |
| 6,506,097 B1 | 1/2003 | Adams et al. | | |
| 6,511,363 B1 * | 1/2003 | Yamane et al. | ................. | 451/6 |
| 6,524,165 B1 | 2/2003 | Wiswesser et al. | | |
| 6,537,832 B1 * | 3/2003 | Otsubo et al. | ................ | 438/16 |

(Continued)

FOREIGN PATENT DOCUMENTS

EP    1066925 A2    1/2001

(Continued)

*Primary Examiner*—Hadi Shakeri
(74) *Attorney, Agent, or Firm*—Wenderoth, Lind & Ponack, L.L.P.

(57) ABSTRACT

A polishing apparatus has a polishing table having a polishing surface, a top ring for holding a workpiece to be polished and pressing the workpiece against the polishing surface on the polishing table, and a film thickness measuring device embedded in the polishing table. The film thickness measuring device includes a light source for applying light having a predetermined wavelength to a surface of the workpiece, a spectroscope for separating light reflected from the surface of the workpiece, and a charge coupled device array for capturing light separated by the spectroscope. The polishing apparatus also has a controller operable to analyze information captured by the charge coupled device array over the entire surface of the workpiece to obtain a film thickness at a desired point on the surface of the workpiece.

6 Claims, 5 Drawing Sheets

U.S. PATENT DOCUMENTS

| | | | |
|---|---|---|---|
| 6,607,422 B1 * | 8/2003 | Swedek et al. | 451/6 |
| 6,716,085 B1 * | 4/2004 | Wiswesser et al. | 451/6 |
| 6,719,818 B1 * | 4/2004 | Birang et al. | 451/41 |
| 6,821,794 B1 * | 11/2004 | Laursen et al. | 451/5 |

FOREIGN PATENT DOCUMENTS

| | | |
|---|---|---|
| WO | 02/103777 | 12/2002 |
| WO | 02/103779 | 12/2002 |

\* cited by examiner

POLISHING APPARATUS

BACKGROUND OF THE INVENTION

1. Field of the Invention

The present invention relates to a polishing apparatus for polishing a workpiece to be polished, and more particularly to a polishing apparatus having a film thickness measuring device for measuring a film thickness of a surface of a workpiece such as a semiconductor wafer.

2. Description of the Related Art

As semiconductor devices have become more highly integrated in recent years, circuit interconnections have become finer and distances between those circuit interconnections have become smaller. In the case of photolithography, which can form interconnections that are at most 0.5 μm wide, it is required that surfaces on which pattern images are to be focused by a stepper should be as flat as possible because the depth of focus of an optical system is relatively small. A polishing apparatus for performing chemical mechanical polishing (CMP) has been used for planarizing such a semiconductor wafer.

In a chemical mechanical polishing process, after a surface of a semiconductor substrate has been polished for a certain period of time, the polishing process should be stopped at a desired timing or at the time when the semiconductor substrate has a desired film thickness. For example, some integrated circuit designs require an insulating film (layer) of $SiO_2$ or the like to be left on a metallic interconnection of copper, aluminum, or the like. Since a metallic layer or other layers are further deposited on the insulating layer in a subsequent process, such an insulating layer is referred to as an interlayer. In this case, if the semiconductor substrate is excessively polished, then the lower metallic layer is exposed on the polished surface. Therefore, the polishing process needs to be stopped in a state in which a predetermined thickness of the interlayer remains unpolished.

According to another polishing process, interconnection grooves having a certain pattern are formed in a surface of a semiconductor substrate, then a Cu layer is deposited on the surface of the semiconductor substrate to fill the interconnection grooves with copper or copper alloy, and unnecessary portions of the Cu layer are removed by a chemical mechanical polishing (CMP) process. Specifically, the Cu layer on the semiconductor substrate is selectively removed by the chemical mechanical polishing process, leaving the Cu layer only within the interconnection grooves. More Specifically, the Cu layer is required to be removed so that an insulating layer of $SiO_2$ or the like is exposed on surfaces other than the interconnection grooves.

In such a case, if the semiconductor substrate is polished so excessively that the Cu layer in the interconnection grooves is removed together with the insulating layer, then the resistance of the circuits on the semiconductor substrate would be so increased that the semiconductor substrate might possibly need to be discarded, resulting in a large loss of resources. Conversely, if the semiconductor substrate is polished so insufficiently as to leave the copper layer on the insulating layer, then interconnections on the semiconductor substrate would not be separated from each other as desired, and short circuits would be caused between those interconnections. As a result, the semiconductor substrate would be required to be polished again, and hence its manufacturing cost would be increased. The above problems also occur when another metallic film of aluminum or the like is formed on a semiconductor substrate and polished by a CMP process.

Therefore, it has been proposed to detect an end point of a CMP process with the use of an optical sensor. Specifically, an optical sensor having a light-emitting element and a light-detecting element is provided in a polishing apparatus. The light-emitting element of the optical sensor applies light to a polished surface of a semiconductor substrate, and the light-detecting element detects a change in reflectance of light reflected from the polished surface to measure the film thickness of an insulating layer or a metallic layer on the polished surface. Thus, the end point of the CMP process is detected from the measured film thickness.

However, a conventional film measuring device using an optical sensor measures the film thickness only at points on a line along a radial direction of the semiconductor substrate or at variable points. Specifically, the conventional film measuring device cannot measure the film thickness at fixed points. Therefore, it is difficult to highly accurately obtain the film thicknesses of the semiconductor substrate through continuous measurement. Further, a conventional polishing apparatus requires a separate film thickness measuring device for inspecting the quality of the polished semiconductor substrate, in addition to a film thickness measuring device for detecting an end point of the CMP process. Therefore, the conventional polishing apparatus needs a larger space for the additional film thickness measuring device, and thus the size of the apparatus becomes larger.

SUMMARY OF THE INVENTION

The present invention has been made in view of the above drawbacks. It is, therefore, an object of the present invention to provide a polishing apparatus having a film thickness measuring device which can accurately measure a film thickness at a specific point (fixed point) on a surface of a workpiece and can reduce the size of the apparatus.

According to a first aspect of the present invention, there is provided a polishing apparatus having a polishing table having a polishing surface, a top ring for holding a workpiece to be polished and pressing the workpiece against the polishing surface on the polishing table, and a film thickness measuring device embedded in the polishing table. The film thickness measuring device includes a light source for applying light having a predetermined wavelength to a surface of the workpiece, a spectroscope for separating light reflected from the surface of the workpiece, and a charge coupled device (CCD) array for capturing light separated by the spectroscope. The polishing apparatus also has a controller operable to analyze information captured by the CCD array over an entire surface of the workpiece to obtain a film thickness at a desired point on the surface of the workpiece.

With the above arrangement, a film thickness can be measured at a specific point (fixed point) on the surface of the workpiece. Therefore, the film thicknesses of the workpiece can be obtained highly accurately through continuous measurement. For example, film thickness measurement may be performed during a polishing process. When the measured film thickness becomes a predetermined value or zero, an end point of the polishing process can be detected accurately. Further, if film thickness measurement is performed after a polishing process, then it is possible to inspect the quality of the polished workpiece. Thus, a single film thickness measuring device can perform film thickness measurement during a polishing process (i.e., in-situ monitoring) and inspection of the quality of a workpiece after the polishing process. Therefore, the polishing apparatus according to the present invention can reduce the space required for film thickness measuring devices. Furthermore, since the entire surface of the workpiece can be scanned, film thicknesses can be obtained at all points on the surface of the workpiece. Therefore, it is possible to detect unevenly polished portions produced on the workpiece.

The CCD array may capture light having a single wavelength, or light having a plurality of wavelengths. It is desirable that the film thickness measuring device has a radial length larger than a radius of the workpiece. The controller may filter a wavelength which is influenced by a polishing liquid used for polishing. In such a case, it is possible to measure the film thickness more accurately because the influence from the polishing liquid is reduced.

According to a second aspect of the present invention, there is provided an electrolytic polishing apparatus having electrodes including a processing electrode, which is brought into contact with or close to a workpiece to be polished, and a feeding electrode to supply electric power to the workpiece. The electrolytic polishing apparatus has a film thickness measuring device disposed adjacent to at least one of the electrodes. The film thickness measuring device includes a light source for applying light having a predetermined wavelength to a surface of the workpiece, a spectroscope for separating light reflected from the surface of the workpiece, and a charge coupled device (CCD) array for capturing light separated by the spectroscope. The electrolytic polishing apparatus also has a controller operable to analyze information captured by the CCD array over an entire surface of the workpiece to obtain a film thickness at a desired point on the surface of the workpiece.

With the above arrangement, a film thickness can be measured at a specific point (fixed point) on the surface of the workpiece. Therefore, the film thicknesses of the workpiece can be obtained highly accurately through continuous measurement. For example, film thickness measurement may be performed during a polishing process. When the measured film thickness becomes a predetermined value or zero, an end point of the polishing process can be detected accurately. Further, if film thickness measurement is performed after a polishing process, then it is possible to inspect the quality of the polished workpiece. Thus, a single film thickness measuring device can perform film thickness measurement during a polishing process (i.e., in-situ monitoring) and inspection of the quality of a workpiece after the polishing process. Therefore, the electrolytic polishing apparatus according to the present invention can reduce the space required for film thickness measuring devices. Furthermore, since the entire surface of the workpiece can be scanned, film thicknesses can be obtained at all points on the surface of the workpiece. Therefore, it is possible to detect unevenly polished portions produced on the workpiece. Particularly, since the electrolytic polishing apparatus employs pure water or ultra pure water, which has a high transmittance, it is possible to measure the film thickness with high accuracy.

The CCD array may capture light having a single wavelength, or light having a plurality of wavelengths. It is desirable that the film thickness measuring device has a radial length larger than a radius of the workpiece. The film thickness measuring device may be disposed between the electrodes. The film thickness measuring device may be disposed in parallel with the electrodes.

According to a third aspect of the present invention, there is provided a polishing method to polish a workpiece. The workpiece is brought into sliding contact with a polishing surface and pressed against the polishing surface while supplying a polishing liquid to the polishing surface. Light is applied to the workpiece over the entire surface of the workpiece. Light reflected from the workpiece is captured over the entire surface of the workpiece.

It is desirable that a specific point is specified on a surface of the workpiece based on a notch or an orientation flat formed in the workpiece, and a film thickness is obtained at the specific point from the light captured over the entire surface of the workpiece. In this case, a pressure applied to the workpiece or the amount of the polishing liquid may be controlled according to the film thickness.

The above and other objects, features, and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

A polishing apparatus according to embodiments of the present invention will be described below with reference to FIGS. 1 through 5B. Like or corresponding parts are denoted by like or corresponding reference numerals throughout the drawings, and will not be described repetitively.

Figure 1:
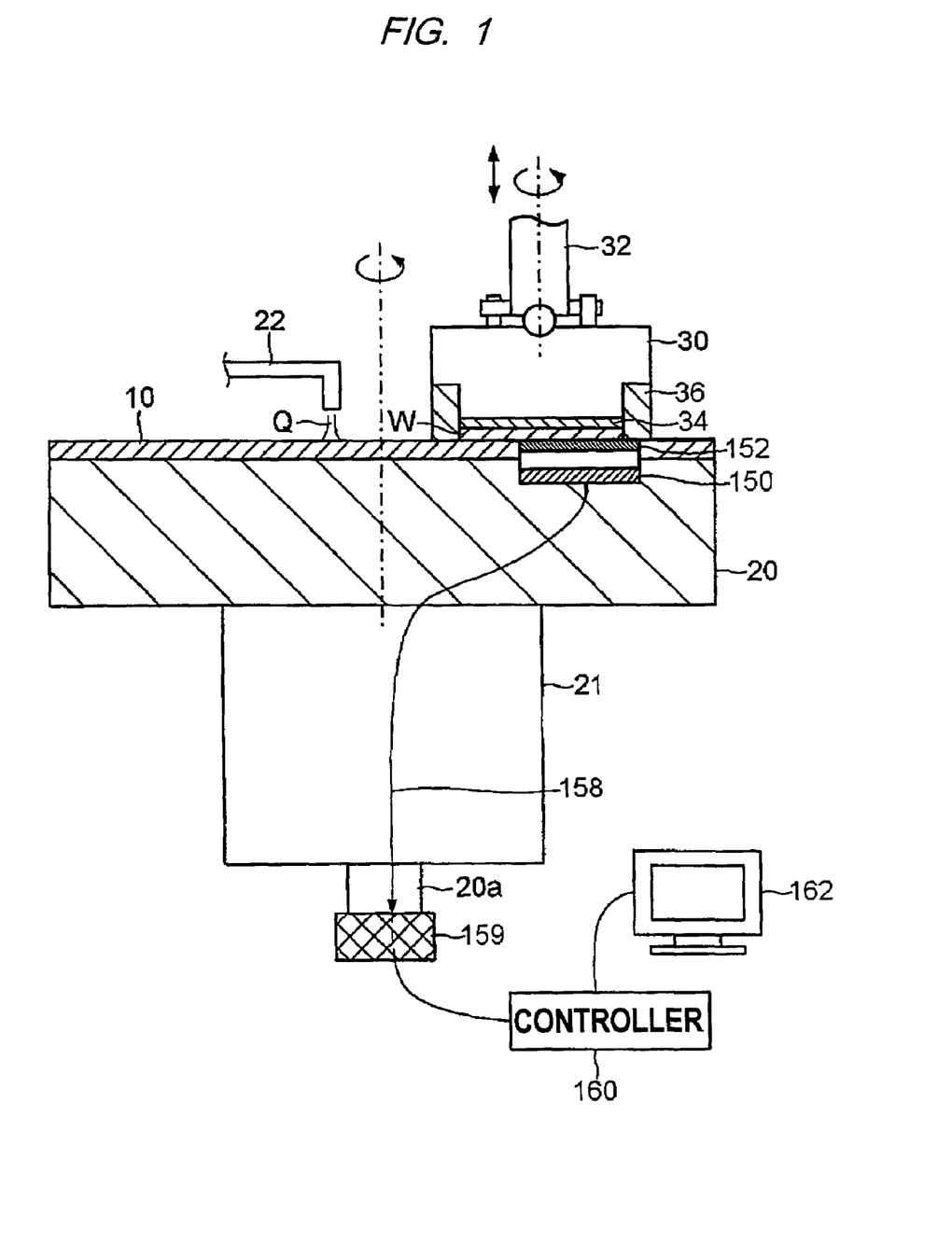
FIG. 1 is a schematic cross-sectional view showing a polishing apparatus according to a first embodiment of the present invention.

FIG. 1 is a schematic cross-sectional view showing a polishing apparatus according to a first embodiment of the present invention. As shown in FIG. 1, the polishing apparatus has a polishing table 20 having a polishing pad 10 attached on an upper surface thereof, and a top ring 30 for holding and pressing a workpiece such as a semiconductor wafer W against an upper surface of the polishing pad 10. The polishing pad 10 has an upper surface serving as a polishing surface which is brought into sliding contact with the semiconductor wafer W to be polished. The polishing surface may alternatively be formed by an upper surface of a fixed abrasive plate comprising fine abrasive particles made of $CeO_2$ or the like which are fixed by a binder of synthetic resin.

The polishing table 20 is coupled to a motor 21 disposed below the polishing table 20. Thus, the polishing table 20 is rotatable about its axis as shown by an arrow in FIG. 1. The polishing apparatus has a polishing liquid supply nozzle 22 provided above the polishing table 20. The polishing liquid supply nozzle 22 supplies a polishing liquid Q onto the polishing pad 10.

The top ring 30 is coupled to a top ring shaft 32, which is connected to a motor (not shown) and a lifting/lowering cylinder (not shown). Thus, the top ring 30 is rotatable about the top ring shaft 32 by the motor and lifted and lowered by the lifting/lowering cylinder, as shown by arrows in FIG. 1. The top ring 30 has an elastic pad 34, which is made of polyurethane or the like, on a lower surface of the top ring 30. The semiconductor wafer W to be polished is attracted under vacuum and held on a lower surface of the elastic pad 34, which is a holding surface.

With such an arrangement, the top ring 30 can press the semiconductor wafer W, which is held on the lower surface of the top ring 30, against the polishing pad 10 under a desired pressure while being rotated. The top ring 30 has a guide ring 36 disposed around a lower outer circumferential edge thereof and around the holding surface thereof for retaining the semiconductor substrate W against dislodgement from the top ring 30.

With the polishing apparatus thus constructed, the semiconductor wafer W, which is held on the lower surface of the top ring 30, is pressed against the polishing pad 10 on the upper surface of the polishing table 20, which is rotated. At that time, the polishing liquid Q is supplied onto the polishing pad 10 from the polishing liquid supply nozzle 22. Thus, the semiconductor wafer W is polished with the polishing liquid Q being present between the lower surface, to be polished, of the semiconductor wafer W and the polishing pad 10.

As shown in FIG. 1, the polishing table 20 has a film thickness measuring device 150 embedded therein. The film thickness measuring device 150 can measure the film thickness of an insulating film (layer) or a metallic film (layer) which is formed on the surface of the semiconductor wafer W The film thickness measuring device 150 has a radial length larger than the radius of the semiconductor wafer W. The polishing pad 10 has a light-transmissive window 152 mounted therein for allowing light from the film thickness measuring device 150 to pass therethrough. The light-transmissive window 152 may be in the form of a rectangular parallelepiped. The light-transmissive window 152 is made of a material having a high transmittance, e.g., non-foamed polyurethane.

Figure 2:
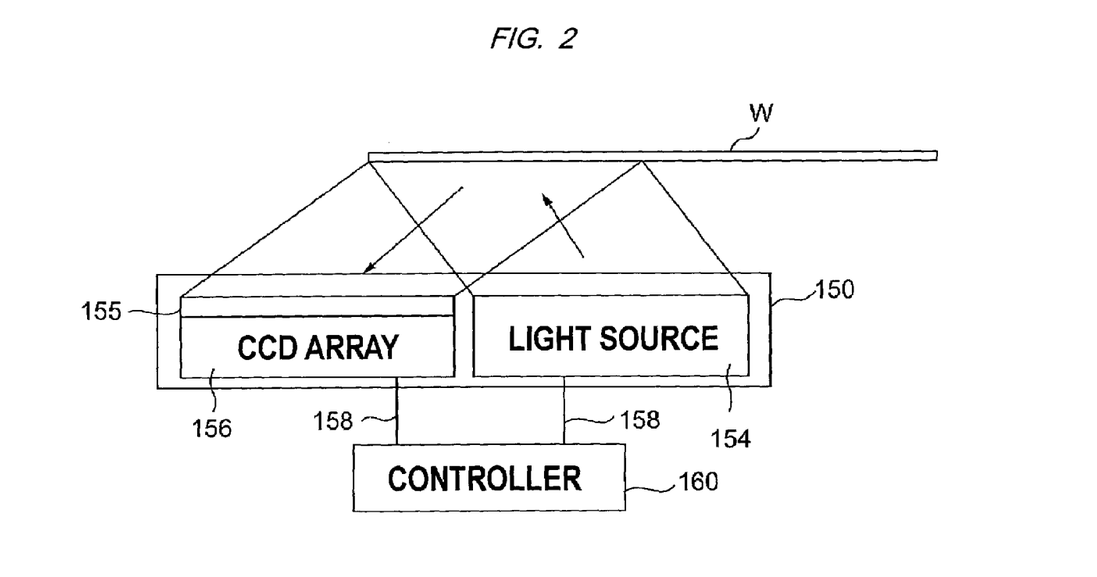
FIG. 2 is a schematic view showing a film thickness measuring device in the polishing apparatus shown in FIG. 1.

FIG. 2 is a schematic view showing the film thickness measuring device 150. As shown in FIG. 2, the film thickness measuring device 150 has a light source 154 for applying light, having a wavelength in a predetermined range, to the surface of the semiconductor wafer W held by the top ring, a spectroscope 155 for separating light reflected from the surface of the semiconductor wafer W, and a charge coupled device array (CCD array) 156 for capturing light separated by the spectroscope 155. The light source 154 and the CCD array 156 in the film thickness measuring device 150 are connected to a controller 160 by a cable 158, which extends through the polishing table 20, a polishing table shaft 20a, and a rotary connector 159 mounted on an end of the polishing table shaft 20a (see FIG. 1). The controller 160 is connected to an output device such as a display unit 162. As is clear from the above as well as FIGS. 1–3, the sum of the radial lengths of the light source and the spectroscope is larger than a radius of the holding surface of the top ring.

Figure 3:
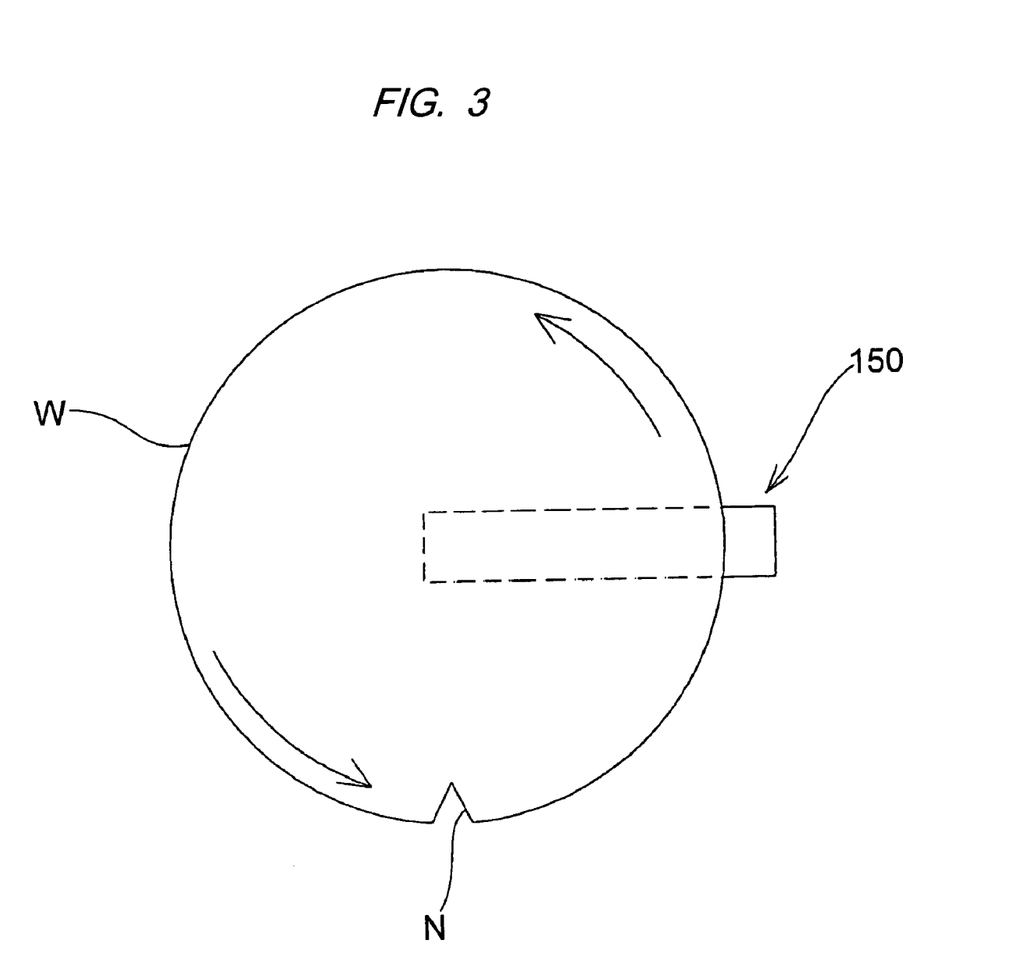
FIG. 3 is a schematic plan view explanatory of the operation of the film thickness measuring device shown in FIG. 2.

Light emitted from the light source 154 in the film thickness measuring device 150 is reflected from the surface of the semiconductor wafer W The reflected light is separated by the spectroscope 155 and applied to the CCD array 156. The CCD array 156 captures the intensity of the light (spectral reflectance) as an image with respect to one or more wavelengths, for example. As shown in FIG. 3, since the film thickness measuring device 150 has a radial length larger than the radius of the semiconductor wafer W, the film thickness measuring device 150 can scan the entire surface of the semiconductor wafer W when the semiconductor wafer W makes one revolution above the film thickness measuring device 150 according to the rotation of the top ring 30. The controller 160 analyzes the information (i.e., spectral reflectance), which is captured by the CCD array 156, over the entire surface of the semiconductor wafer W to obtain a film thickness at a specific point (measuring point) on the surface of the semiconductor wafer W. At that time, the measuring point can be specified based on a notch N (or an orientation flat) formed at a peripheral edge of the wafer W for identifying the orientation of the semiconductor wafer W.

According to the present embodiment, a film thickness can be measured at a specific point (fixed point) on the surface of the semiconductor wafer W. Therefore, the film thicknesses of the semiconductor wafer W can be obtained highly accurately through continuous measurement. For example, film thickness measurement is performed during a polishing process. When the measured film thickness becomes a predetermined value or zero, an end point of the CMP process can be detected accurately. Further, if film thickness measurement is performed after a polishing process, then it is possible to inspect the quality of the polished semiconductor wafer W. Thus, a single film thickness measuring device can perform film thickness measurement during a polishing process (i.e., in-situ monitoring) and inspecting the quality of a wafer after the polishing process. Therefore, the polishing apparatus according to the present invention can reduce the space required for film thickness measuring devices.

Further, since the entire surface of the semiconductor wafer W can be scanned, film thicknesses can be obtained at all points on the surface of the semiconductor wafer W. Therefore, it is possible to detect unevenly polished portions produced on the semiconductor wafer W For example, the information on the film thickness obtained by the film thickness measuring device may be sent to a polishing controller (not shown), which controls pressures applied to the semiconductor wafer W during polishing. In such a case, it is possible to minimize unevenly polished portions by adjusting the pressing forces applied to the semiconductor wafer W or the amount of the polishing liquid.

It is desirable that wavelengths which are influenced by the polishing liquid Q used for polishing, e.g., wavelengths around particle diameters of silica or ceria included in the polishing liquid, be filtered when the controller 160 analyzes the information of the entire surface of the semiconductor wafer W. In this case, it is possible to measure the film thickness more accurately because the influence from the polishing liquid Q is reduced.

Figure 4A:
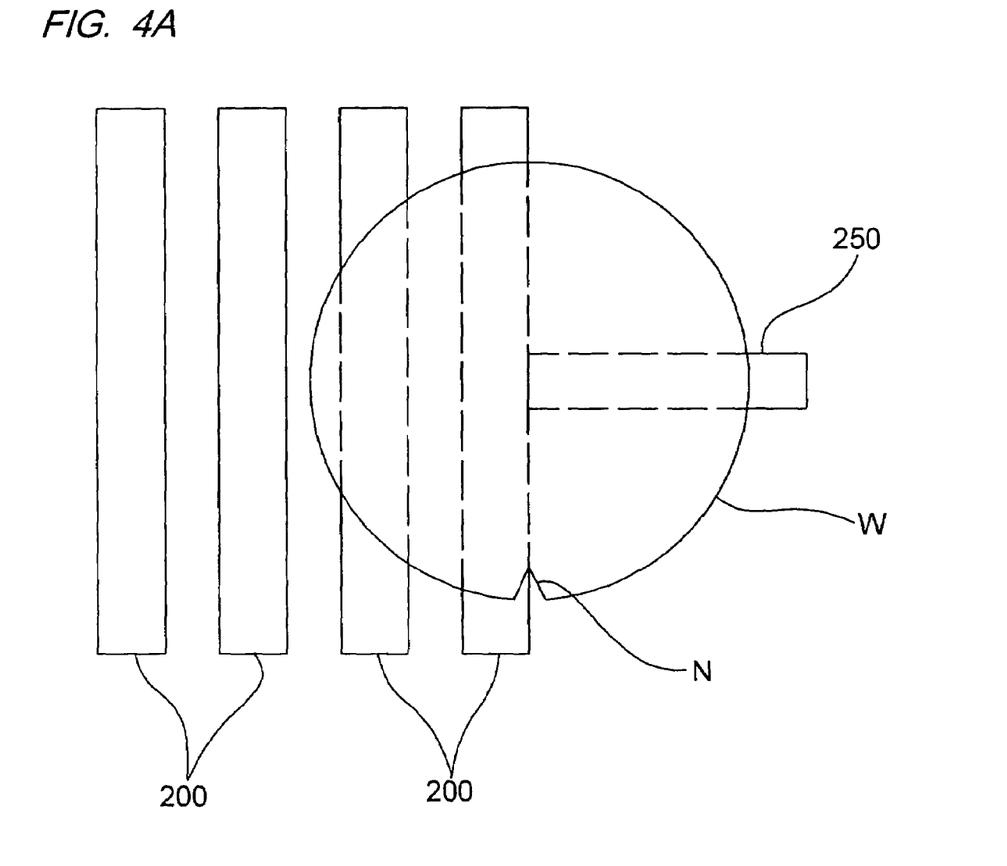
FIG. 4A is a schematic plan view showing a polishing apparatus according to a second embodiment of the present invention.
Figure 4B:
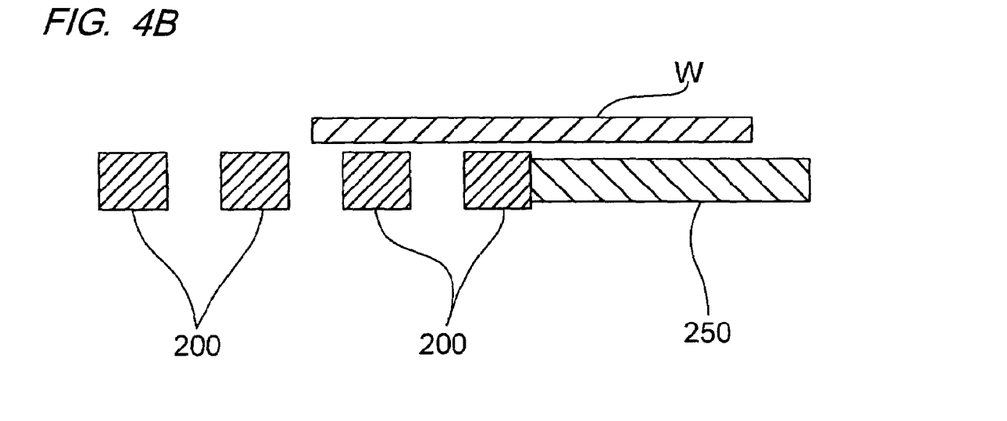
FIG. 4B is a schematic cross-sectional view of FIG. 4A.

The aforementioned film thickness measuring device may be incorporated into a polishing apparatus for performing electrolytic polishing. FIGS. 4A and 4B are schematic views showing an electrolytic polishing apparatus according to a second embodiment in which the film thickness measuring device is incorporated. The polishing apparatus according to the present embodiment has a plurality of electrodes 200 disposed in parallel with each other. The electrodes 200 have upper surfaces covered with an ion exchanger (not shown). The electrodes 200 are connected alternately to an anode and a cathode of a power supply (not shown) to form processing electrodes and feeding electrodes, respectively. For example, when copper is to be polished, electrolytic polishing is performed on the cathode. Therefore, electrodes connected to the cathode form processing electrodes, and electrodes connected to the anode form feeding electrodes.

When the semiconductor wafer W is polished, the semiconductor wafer W is brought into contact with or close to the surface of the ion exchanger on the electrodes 200. The semiconductor wafer W and the electrodes 200 are moved relative to each other. At that time, pure water or ultra pure water is supplied between the semiconductor wafer W and the electrodes 200. When a predetermined voltage is applied between the processing electrodes and the feeding electrodes, the ion exchanger produces hydrogen ions or hydroxide ions. The hydrogen ions or hydroxide ions perform electrolytic polishing on the processing electrodes to process a conductive film formed on a surface of the semiconductor wafer W.

As shown in FIGS. 4A and 4B, the polishing apparatus has a film thickness measuring device 250, which is the same as the film thickness measuring device 150 in the first embodiment. The film thickness measuring device 250 is disposed adjacent to one of electrodes 200. As with the first embodiment, the film thickness measuring device 250 has a radial length larger than the radius of the semiconductor wafer W. Therefore, the film thickness measuring device 250 can scan the entire surface of the semiconductor wafer W when the semiconductor wafer W makes one revolution above the film thickness measuring device 250.

In this case, pure water or ultra pure water is supplied between the semiconductor wafer W and the electrodes 200. Thus, since pure water or ultra pure water, which has a high transmittance, are present between the semiconductor wafer W and the upper surface of the film thickness measuring device 250, it is possible to measure the film thickness with high accuracy.

Further, since the entire surface of the semiconductor wafer W can be scanned, film thicknesses can be obtained at all points on the surface of the semiconductor wafer W. Therefore, it is possible to detect unevenly polished portions produced on the semiconductor wafer W. It is possible to minimize unevenly polished portions by adjusting a voltage applied between the electrodes 200 or the amount of the pure water or ultra pure water.

It is desirable that a fluid flows as a laminar flow between the film thickness measuring device 250 and the surface of the semiconductor wafer W. When the fluid flows as a laminar flow, turbulence can be eliminated between the film thickness measuring device 250 and the surface of the semiconductor wafer W. Therefore, it is possible to measure the film thickness under better conditions.

Figure 5A:
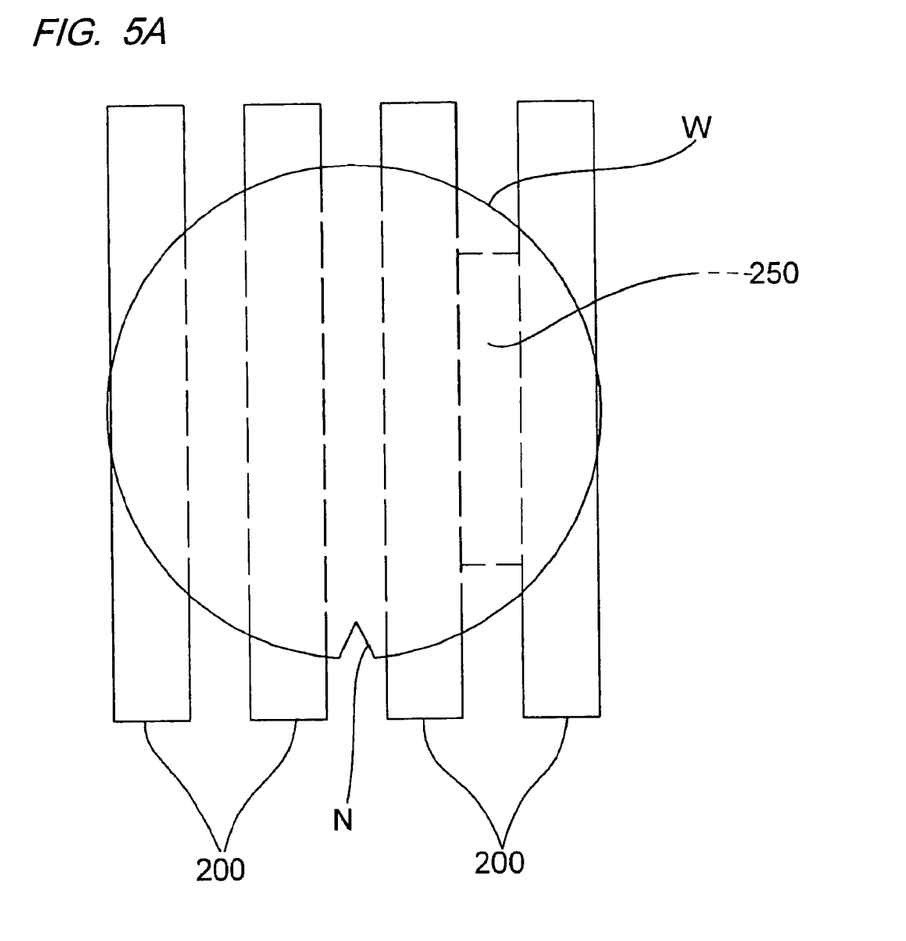
FIG. 5A is a schematic plan view showing a modification of the polishing apparatus shown in FIG. 4A.
Figure 5B:
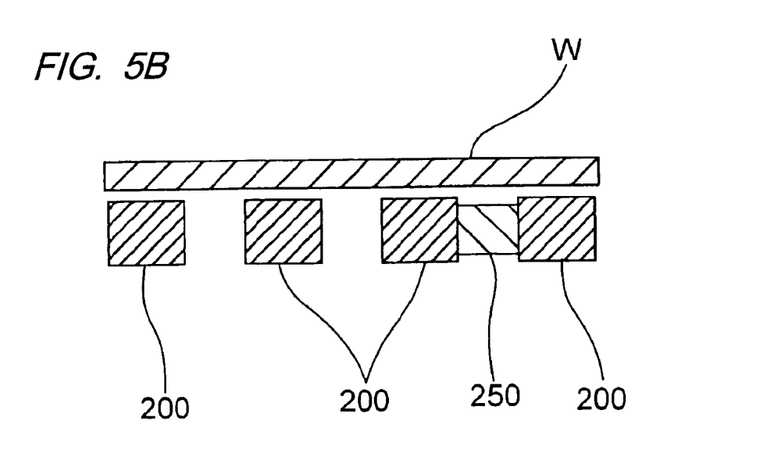
FIG. 5B is a schematic cross-sectional view of FIG. 5A.

FIGS. 5A and 5B are schematic views showing a modification of the polishing apparatus in the second embodiment. In this modification, a film thickness measuring device 250 is disposed between electrodes 200 and in parallel with the electrodes 200. Such an arrangement can effectively reduce the size of the polishing apparatus.

Although certain preferred embodiments of the present invention have been shown and described in detail, it should be understood that various changes and modifications may be made therein without departing from the scope of the appended claims.

What is claimed is:

1. A polishing apparatus comprising:
   a polishing table having a polishing surface, said polishing table being rotatable about an axis;
   a top ring for holding and rotating a workpiece to be polished and pressing a surface of the workpiece against said polishing surface on said polishing table, said top ring having a holding surface for holding the workpiece thereon and a guide ring disposed around said holding surface of said top ring for retaining the workpiece;
   a film thickness measuring device embedded in said polishing table, said film thickness measuring device including:
      a light source facing the surface of the workpiece held by said top ring for applying light having a predetermined wavelength to a surface of the workpiece,
      a spectroscope for separating light reflected from the surface of the workpiece, a sum of radial lengths of said light source and said spectroscope being larger than a radius of said holding surface of said top ring, and
      a charge coupled device array for capturing light separated by said spectroscope, wherein said film thickness measuring device is configured to scan an entire surface of the workpiece according to rotation of said top ring and said polishing table; and
   a controller operable to analyze information captured by said charge coupled device array over an entire surface of the workpiece to obtain a film thickness at a desired point on the surface of the workpiece.

2. The polishing apparatus according to claim 1, wherein said charge coupled device array captures light having a single wavelength.

3. The polishing apparatus according to claim 1, wherein said charge coupled device array captures light having a plurality of wavelengths.

4. The polishing apparatus according to claim 1, wherein said controller filters a wavelength which is influenced by a polishing liquid used for polishing.

5. A polishing apparatus comprising:
   a polishing table having a polishing surface, said polishing table being rotatable about an axis;
   a top ring for holding and rotating a workpiece to be polished and pressing the workpiece against said polishing surface on said polishing table, said top ring having a holding surface for holding the workpiece thereon and a guide ring disposed around said holding surface of said top ring for retaining the workpiece;
   a film thickness measuring device embedded in said polishing table, said film thickness measuring device including:
      a light source facing the surface of the workpiece held by said top ring for applying light having a predetermined wavelength to a surface of the workpiece,
      a spectroscope for separating light reflected from the surface of the workpiece, a sum of radial lengths of said light source and said spectroscope being larger than a radius of said holding surface of said top ring, wherein said film thickness measuring device is configured to scan an entire surface of the workpiece according to rotation of said top ring and said polishing table; and
      a charge coupled device array for capturing light separated by said spectroscope; and
   a controller operable to analyze information captured by said charge coupled device array over an entire surface of the workpiece.

6. A polishing apparatus comprising:
   a polishing table having a polishing surface, said polishing table being rotatable about an axis;
   a top ring for holding and rotating a workpiece to be polished and pressing the workpiece against said polishing surface on said polishing table, said top ring having a holding surface for holding the workpiece thereon and a guide ring disposed around said holding surface of said top ring for retaining the workpiece; and a film thickness measuring device embedded in said polishing table, said film thickness measuring device including:

a light source facing the surface of the workpiece held by said top ring for applying light having a predetermined wavelength to a surface of the workpiece;

a spectroscope for separating light reflected from the surface of the workpiece, a sum of radial lengths of said light source and said spectroscope being larger than a radius of said holding surface of said top ring; and a charge coupled device array for capturing light separated by said spectroscope:

wherein said film thickness measuring device is configured to scan an entire surface of the workpiece according to rotation of said top ring and said polishing table.

* * * * *